(12) United States Patent
Feng

(10) Patent No.: US 12,675,619 B2
(45) Date of Patent: *Jul. 7, 2026

(54) STATE ESTIMATION FOR A POWER SYSTEM USING PARAMETERIZED POTENTIAL FUNCTIONS FOR INEQUALITY CONSTRAINTS

(71) Applicant: Hitachi Energy Ltd, Zürich (CH)

(72) Inventor: Xiaoming Feng, Cary, NC (US)

(73) Assignee: HITACHI ENERGY LTD, Zürich (CH)

( * ) Notice: Subject to any disclaimer, the term of this patent is extended or adjusted under 35 U.S.C. 154(b) by 923 days.

This patent is subject to a terminal disclaimer.

(21) Appl. No.: 17/879,449

(22) Filed: Aug. 2, 2022

(65) Prior Publication Data

US 2024/0046005 A1 Feb. 8, 2024

(51) Int. Cl.
 *G06F 30/20* (2020.01)
 *G06F 111/10* (2020.01)
 *G06F 119/06* (2020.01)

(52) U.S. Cl.
 CPC .......... *G06F 30/20* (2020.01); *G06F 2111/10* (2020.01); *G06F 2119/06* (2020.01)

(58) Field of Classification Search
 CPC .. G06F 30/20; G06F 2111/10; G06F 2119/06; H02J 3/0012; H02J 2203/20; H02J 13/00002
 See application file for complete search history.

(56) References Cited

U.S. PATENT DOCUMENTS

| | | | |
|---|---|---|---|
| 8,738,191 B2 | 5/2014 | Aivaliotis et al. | |
| 2012/0041610 A1* | 2/2012 | Varigonda | F24D 18/00 700/288 |

(Continued)

FOREIGN PATENT DOCUMENTS

| | | |
|---|---|---|
| CN | 109390929 A | 2/2019 |
| CN | 113139288 A | 7/2021 |

(Continued)

OTHER PUBLICATIONS

Clements et al., "A New Method for Solving Equality-Constrained Power System Static-State Estimation", IEEE Transactions on Power Systems, vol. 5, No. 4, Nov. 1990, pp. 1260-1266.

(Continued)

*Primary Examiner* — Nicholas Klicos
(74) *Attorney, Agent, or Firm* — PROCOPIO, CORY, HARGREAVES & SAVITCH LLP

(57) ABSTRACT

Prior methods of state estimation rely on penalty-based heuristics to enforce inequality constraints, which can produce very large weight values, resulting in ill-conditioning of the gain matrix. Disclosed embodiments of state estimation convert the inequality-constrained optimization problem into an unconstrained optimization problem in which violated inequality constraints are represented as parameterized potential functions, each comprising a center-of-attraction parameter. This unconstrained convex optimization problem can be iteratively prepared, using successively updated values for the center-of-attraction parameters, and solved, until no inequality constraints are violated, to produce a final estimated state. This final estimated state may then be used to control the system being monitored, such as a power system.

16 Claims, 6 Drawing Sheets

(56) References Cited

U.S. PATENT DOCUMENTS

| | | | | |
|---|---|---|---|---|
| 2012/0078869 | A1* | 3/2012 | Bellville | G06F 16/90 |
| | | | | 707/706 |
| 2012/0317060 | A1 | 12/2012 | Jebara | |
| 2013/0238294 | A1* | 9/2013 | Legbedji | G06Q 50/06 |
| | | | | 703/2 |
| 2014/0025352 | A1* | 1/2014 | Ghosh | G06F 17/10 |
| | | | | 703/2 |
| 2014/0200868 | A1* | 7/2014 | Motto | G06F 30/13 |
| | | | | 703/2 |
| 2017/0102162 | A1* | 4/2017 | Drees | F24F 11/523 |
| 2017/0187194 | A1* | 6/2017 | Hart | H02J 3/32 |
| 2017/0270124 | A1* | 9/2017 | Nagano | G06F 16/248 |
| 2017/0288455 | A1* | 10/2017 | Fife | H02J 3/00 |
| 2019/0356164 | A1* | 11/2019 | Ghaemi | G06Q 10/00 |
| 2020/0006944 | A1* | 1/2020 | Fife | H02J 3/004 |
| 2020/0076196 | A1* | 3/2020 | Lee | H02J 3/008 |
| 2021/0143638 | A1 | 5/2021 | Cavraro et al. | |
| 2021/0218273 | A1 | 7/2021 | Feng | |
| 2022/0037916 | A1* | 2/2022 | Abbaszadeh | H02J 3/06 |
| 2022/0115867 | A1* | 4/2022 | Ratnayake | H02J 3/0012 |
| 2023/0072795 | A1 | 3/2023 | Zeng et al. | |
| 2023/0088537 | A1* | 3/2023 | Harris | G06F 30/17 |
| | | | | 700/98 |

FOREIGN PATENT DOCUMENTS

| | | |
|---|---|---|
| CN | 114417414 A | 4/2022 |
| JP | H0974676 A | 3/1997 |
| JP | 2016130928 A | 7/2016 |
| JP | 2017506494 A | 3/2017 |
| JP | 2021144569 A | 9/2021 |

OTHER PUBLICATIONS

Nucera et al., "A Blocked Sparse Matrix Formulation for the Solution of Equality-Constrained State Estimation", IEEE Transactions on Power Systems, vol. 6, No. 1, Feb. 1991, pp. 214-224.

Clements et al. "Power System State Estimation With Inequality Constraints", Worcester, MA USA, CH 3006-4/91/0000-0990@IEEE, pp. 990-993.

Abur, et al., "Least Absolute Value State Estimation with Equality and Inequality Constraints", IEEE Transactions on Power Systems, vol. 8, No. 2, May 1993, pp. 680-686.

Clements et al., "Treatment of Inequality Constraints in Power System State Estimation", IEEE Transactions on Power Systems, vol. 10, No. 2, May 1995, pp. 567-574.

Singh et al., "Constrained LAV State Estimation Using Penalty Functions, on with Equality and Inequality Constraints", IEEE Transactions on Power Systems, vol. 12, No. 1, Feb. 1997, pp. 383-388.

Korres, "A Robust Method for Equality Constrained State Estimation", IEEE Transactions on Power Systems, vol. 17, No. 2, May 2002, pp. 305-314.

De La Villa Jaen, et al, "Implicitly Constrained Substation Model for State Estimation", IEEE Transactions on Power Systems, vol. 17, No. 3, Aug. 2002, pp. 850-856.

Lin et al., "A Decentralized Step-size Technique Used to Solve Large Scale Constrained State Estimation Problem", 2005 IEEE/PES Transmission and Distribution Conference & Exhibition: Asia and Pacific Dalian, China, 6 pages.

Khokhlov, "Constrained Power System State Estimation on Recurrent Neural Networks", Power Tech, 2005, IEEE Xplore, 7 pages.

Hewett et al., "A Robust Null Space Method for Linear Equality Constrained State Estimation", IEEE Transactions on Signal Processing, vol. 58, No. 8, Aug. 2010, pp. 3961-3971.

Valverde et al., "A Constrained Formulation for Hybrid State Estimation", IEEE Transactions on Power Systems, vol. 26, No. 3, Aug. 2011, pp. 1102-1109.

Korres et al., "A Constrained Ordering for Solving the Equality Constrained State Estimation", IEEE Transactions on Power Systems, vol. 27, No. 4, Nov. 2012, pp. 1998-2005.

Gomez-Quiles et al., "Equality-Constrained Bilinear State Estimation", IEEE Transactions on Power Systems, vol. 28, No. 2, May 2013, pp. 902-910.

Pires et al., "Constrained Robust Estimation of Power System State Variables and Transformer Tap Positions Under Erroneous Zero-Injections", IEEE Transactions on Power Systems, vol. 29, No. 3, May 2014, pp. 1144-1152.

Kumagai et al., "Constrained State Estimation with Partial Measurements in Unobservable Distribution Network", IEEE Xplore, 2015, 5 pages.

Sodhi et al., "ICS: Incremental Constrained Smoothing for State Estimation", 2020 IEEE International Conference on Robotics and Automation (ICRA), May 31-Aug. 31, 2020. Paris, France, pp. 279-285.

Vanin et al., "A Framework for Constrained Static State Estimation in Unbalanced Distribution Networks", IEEE Transactions on Power Systems, 2021, 11 pages.

Wu et al., "Iterative Method of Maximum likelihood for State Estimation with Inequality Constraints", 2012 International Conference on Computer Science and Electronics Engineering, pp. 576-579.

\* cited by examiner

STATE ESTIMATION FOR A POWER SYSTEM USING PARAMETERIZED POTENTIAL FUNCTIONS FOR INEQUALITY CONSTRAINTS

BACKGROUND

Field of the Invention

The embodiments described herein are generally directed to state estimation, and, more particularly, to state estimation for a power system using parameterized potential functions for inequality constraints.

Description of the Related Art

State estimation (SE) is used in management systems to estimate the most likely state of a network of a power system (e.g., power grid) from a sparsely redundant set of measurements of nodal and branch quantities (e.g., nodal voltage phasors, power injections, and branch power flows). State estimation is necessary for complex systems in which the state cannot be directly observed and/or measurements of the state are prone to noise or corruption. The state of each node in the network of a power system may be defined, for example, by a nodal voltage magnitude and a nodal phase angle. Examples of management systems that utilize state estimation include, without limitation, a supervisory control and data acquisition (SCADA) system, an energy management system (EMS), a distribution management system (DMS), an advanced DMS (ADMS), and the like.

Conventionally, state estimation is solved either as an unconstrained non-linear weighted least squares (WLS) problem or as an equality-constrained non-linear WLS problem, to avoid numerical ill-conditioning for nodes (e.g., buses) with zero power injection. In these cases, the solution does not enforce feasibility constraints on the power injection. For instance, a distributed energy resource (DER) with a maximum output of 10 kilowatts (KW) may be estimated, in the solution, to produce 12 KW. Such conditions may occur in state estimation for both transmission and distribution systems, but are more likely to occur in state estimation for distribution systems due to lower telemetry redundancy and lower data quality. Thus, management systems would benefit from state estimation that constrains nodal metrics (e.g., power output) to feasible values.

SUMMARY

Accordingly, systems, methods, and non-transitory computer-readable media are disclosed for state estimation for a power system, using parameterized potential functions (e.g., quadratic functions) for inequality constraints. An objective of embodiments is to constrain the solution for an SE problem to feasible values by satisfying all inequality constraints within a tolerance. A further objective of embodiments is to eliminate the need for very large weight values, to thereby avoid ill-conditioning of the gain matrix of the objective function. A further objective of embodiments is to estimate a state for a system, such as a power system, that can be used to optimize and control the system.

In an embodiment of a method of state estimation for a power system, the method comprises using at least one hardware processor to: acquire a constrained optimization problem comprising a convex first objective function to be minimized subject to one or more inequality constraints; convert the constrained optimization problem into an unconstrained convex optimization problem comprising a second objective function that is a sum of the first objective function and a parameterized potential function for each of at least a subset of the one or more inequality constraints, wherein each parameterized potential function is defined by an inequality function and a center-of-attraction parameter; and perform a solution process comprising solving the unconstrained convex optimization problem by finding an input to the unconstrained convex optimization problem that minimizes an output of the unconstrained convex optimization problem, wherein one or more center-of-attraction parameters are updated when solving the unconstrained convex optimization problem to ensure that the input satisfies the one or more inequality constraints within a tolerance, and wherein the input represents an estimated state of the power system. The method may further comprise using the at least one hardware processor to control the power system based on the estimated state. The method may further comprise providing the estimated state of the power system through a human-to-machine interface of an energy management system. The method may further comprise using the estimated state in one or more of a contingency analysis, Volt-Var optimization, or optimal power flow, such as distributed energy resource management. The first objective function may comprise an error calculation in which a value of a measurement function, given the input, is subtracted from a value of a system telemetry.

The method may further comprise using the at least one hardware processor to: solve the first objective function without any inequality constraints by finding an initial optimizing input to the first objective function that minimizes an output of the first objective function, regardless of the one or more inequality constraints; determine whether or not the one or more inequality constraints are violated by the initial optimizing input; when having determined that the one or more inequality constraints are not violated, use the initial optimizing input as an output estimated state of the power system; and when having determined that at least one of the one or more inequality constraints is violated, until the one or more inequality constraints are not violated, over one or more iterations, perform the solution process, wherein the solution process further comprises determining a value of each center-of-attraction parameter in each parametric potential function in the unconstrained convex optimization problem, and use the input found by the solution process in a final one of the one or more iterations as the output estimated state of the power system. The method may further comprise using the at least one hardware processor to control the power system based on the final estimated state. In an embodiment, the one or more inequality constraints are determined to be violated when at least one of the one or more inequality constraints is outside of the tolerance, and wherein the one or more inequality constraints are determined not to be violated when all of the one or more inequality constraints are within the tolerance. In the solution process in each of the one or more iterations, a parameterized potential function may be included in the unconstrained convex optimization problem for each of the one or more inequality constraints that are violated and none of the one or more inequality constraints that have not been violated. Determining the value of each center-of-attraction parameter may comprise calculating the value of each center-of-attraction parameter based on a prior value of that center-of-attraction parameter. Determining the value of each center-of-attraction parameter may comprise calculating the value of each center-of-attraction parameter in each parameterized potential function based on a value of the inequality function in that parameterized potential function.

For an inequality constraint expressed as $g(x) \leq 0$, each parameterized potential function may be defined as:

$$w(g(x) - u)^2$$

wherein w is a weight, x is the input, $g(x)$ is the inequality function, and u is the center-of-attraction parameter. The second objective function may be defined as:

$$f(x) + \sum_j w_j(g_j(x) - u_j)^2$$

wherein $f(x)$ is the first objective function, and j is an index of a set of inequality constraints for which a parameterized potential function is included in the unconstrained convex optimization problem.

Determining the value of each center-of-attraction parameter $u_j$ in an iteration k may comprise: when the center-of-attraction parameter $$u_j^{(k)}$$

does not have a prior value, setting the value of the center-of-attraction parameter $$u_j^{(k)}$$

to a predefined value $u^{initial}$; and when the center-of-attraction parameter $$u_j^{(k)}$$

has a prior value $$u_j^{(k-1)},$$

updating the value of the center-of-attraction parameter $$u_j^{(k)}$$

according to the prior value $$u_j^{(k-1)}$$

and a value of the inequality function $g_j(x^{(k-1)})$. The predefined value $u^{initial}$ may be equal to zero.

Determining the value of the center-of-attraction parameter $$u_j^{(k)}$$

in an iteration k may be performed as follows: determine a set $V^{(k)}$ that consists of all inequality constraints that have been determined to be violated in all prior iterations up to and including iteration k; determine a set $A^{(k)}$ that consists of any inequality constraints that are determined to be violated by an optimizing input $x^{(k-1)}$ (i.e., the input that minimizes the second objective function) found in iteration k−1 and were not in the set of inequality constraints in any preceding iteration; when $A^{(k)}$ is not empty, $$u_j^{(k)} = u_j^{(k-1)}, j \in V^{(k)} \text{ and } j \notin A^{(k)},$$
$$u_j^{(k)} = u^{initial}, j \in A^{(k)}; \text{ and}$$

when $A^{(k)}$ is empty, $$u_j^{(k)} = u_j^{(k-1)} - \alpha * g_j(x^{(k-1)}), j \text{ for which } g_j(x^{(k-1)}) \geq 0,$$
$$u_j^{(k)} = u_j^{(k-1)} + \alpha * (g_j(x^{(k-1)}) - u_j^{(k-1)}), j \text{ for which } g_j(x^{(k-1)}) < 0,$$

wherein $u^{initial}$ is a predefined value, $\alpha$ is a scaling factor, $0 < \alpha \leq 1$, and $\varepsilon$ is the tolerance.

For an inequality constraint expressed as $g(x) \leq 0$, each parameterized potential function may be defined as:

$$w(g(x) - u)^2$$

wherein w is a weight, x is the input, $g(x)$ is the inequality function, and u is the center-of-attraction parameter.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for state estimation for a power system, using parameterized potential functions for inequality constraints. It is generally contemplated that the state estimation will be performed for a power system, such as a power grid (e.g., at any scale, from a large-scale utility grid to a microgrid or smaller). A power system may be any network of electrical components (e.g., power system equipment) configured to generate, store, supply, transmit, distribute, and/or consume electrical power, including, without limitation, power stations configured to produce electricity from combustible fuels (e.g., coal, natural gas, etc.) and/or renewable resources (e.g., wind, solar, nuclear, etc.), transmission systems configured to carry or transmit electricity from sources (e.g., generators) to loads, and distribution systems configured to feed supplied electricity to nearby homes, businesses, and/or other establishments. However, the disclosed approach is not limited to power systems. Rather, the disclosed approach may be applied to any system whose state is estimated using a WLS problem with one or more inequality constraints.

As used herein, the term "network" refers to the interconnection of components within a system whose state is to be estimated. In the case of a power system, these components will generally include electrical components, such as power generators, distributed energy resources (e.g., renewable energy sources, battery energy storage (BES) systems, etc.), loads, transformers, transmission and distribution lines, and/or the like. It should be understood that other types of systems may be similarly represented as a network.

As used herein, the term "node" or "bus" generally refers to any point in the network at which a state is to be estimated when solving the SE problem. In the case of a power system, the state of each node may be defined as a voltage magnitude and phase angle at the node. However, the state of a node in a power system could be defined in other manners. It should be understood that the states of nodes in other types of systems will be defined in a manner that is appropriate for that type of system.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Infrastructure

Figure 1:
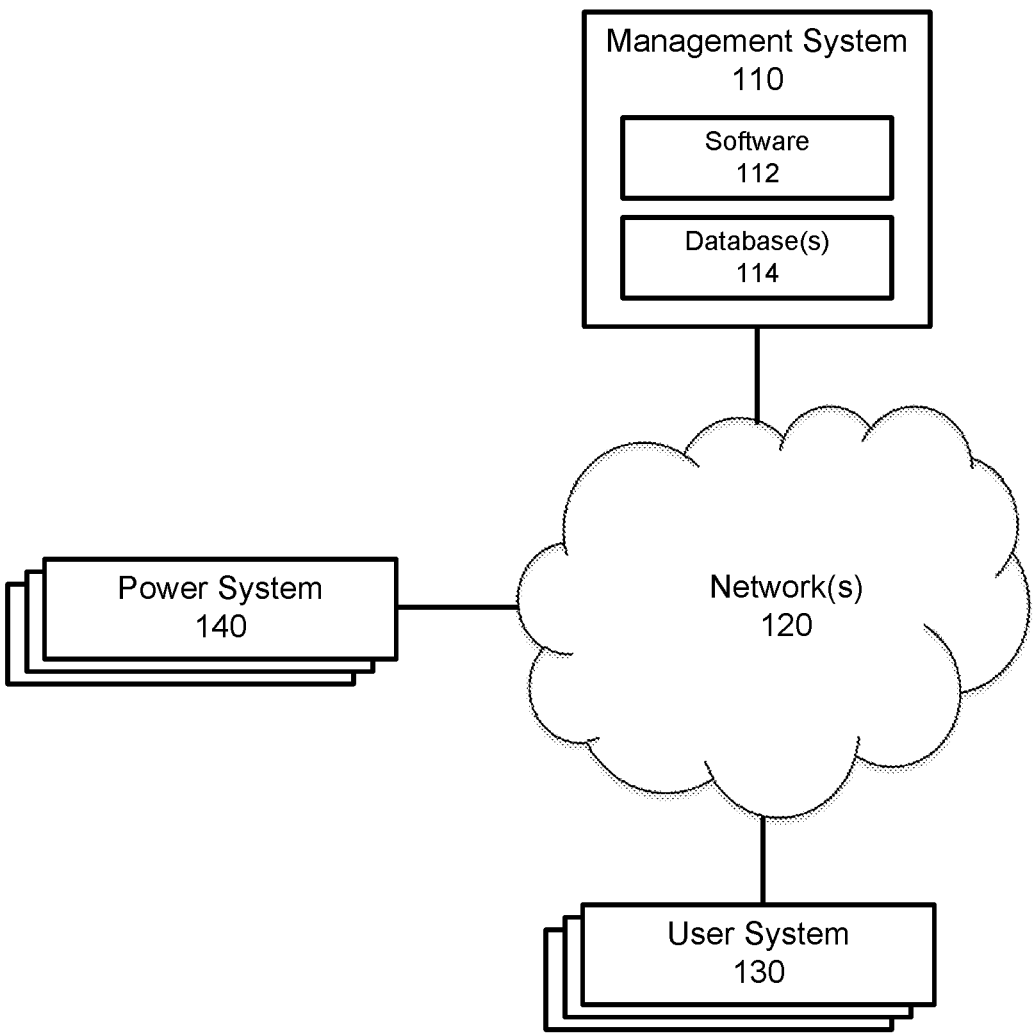
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise a management system 110 (e.g., comprising one or more servers) which hosts and/or executes one or more of the various functions, processes, methods, and/or software modules described herein. Examples of management system 110 include, without limitation, an EMS, DMS, ADMS, SCADA system, and the like. Management system 110 may comprise dedicated servers, or may instead be implemented in a computing cloud, in which the resources of one or more servers are dynamically and elastically allocated to multiple tenants based on demand. In either case, the servers may be collocated (e.g., in a single data center) and/or geographically distributed (e.g., across a plurality of data centers). Management system 110 may also comprise or be communicatively connected to software 112 and/or one or more databases 114. In addition, Management system 110 may be communicatively connected to one or more user systems 130 and/or power systems 140 (e.g., power grids) via one or more networks 120.

Network(s) 120 may comprise the Internet, and EMS 110 may communicate with user system(s) 130 and/or power system(s) 140 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), eXtensible Messaging and Presence Protocol (XMPP), Open Field Message Bus (OpenFMB), IEEE Smart Energy Profile Application Protocol (IEEE 2030.5), and the like, as well as proprietary protocols. While management system 110 is illustrated as being connected to various systems through a single set of network(s) 120, it should be understood that management system 110 may be connected to the various systems via different sets of one or more networks. For example, management system 110 may be connected to a subset of user systems 130 and/or power systems 140 via the Internet, but may be connected to one or more other user systems 130 and/or power systems 140 via an intranet. Furthermore, while only a few user systems 130 and power systems 140, one instance of software 112, and one set of database(s) 114 are illustrated, it should be understood that the infrastructure may comprise any number of user systems, power systems, software instances, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, embedded controllers, programmable logic controllers (PLCs), and/or the like. However, it is generally contemplated that user system(s) 130 would comprise personal computers, mobile devices, or workstations by which agents of an operator of a power system 140 can interact with management system 110. These interactions may comprise inputting data (e.g., parameters for configuring one or more of the processes described herein) and/or receiving data (e.g., the outputs of one or more processes described herein) via a graphical user interface provided by management system 110 or a system between management system 110 and user system(s) 130. The graphical user interface may comprise screens (e.g., webpages) that include a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114).

Management system 110 may execute software 112, comprising one or more software modules that implement one or more of the disclosed processes. In addition, management system 110 may comprise, be communicatively coupled with, or otherwise have access to one or more database(s) 114 that store the data input into and/or output from one or more of the disclosed processes. Any suitable database may be utilized, including without limitation MySQL™, Oracle™, IBM™, Microsoft SQL™, Access™, PostgreSQL™, and the like, including cloud-based databases, proprietary databases, and unstructured databases.

1.2. Example Processing Device

Figure 2:
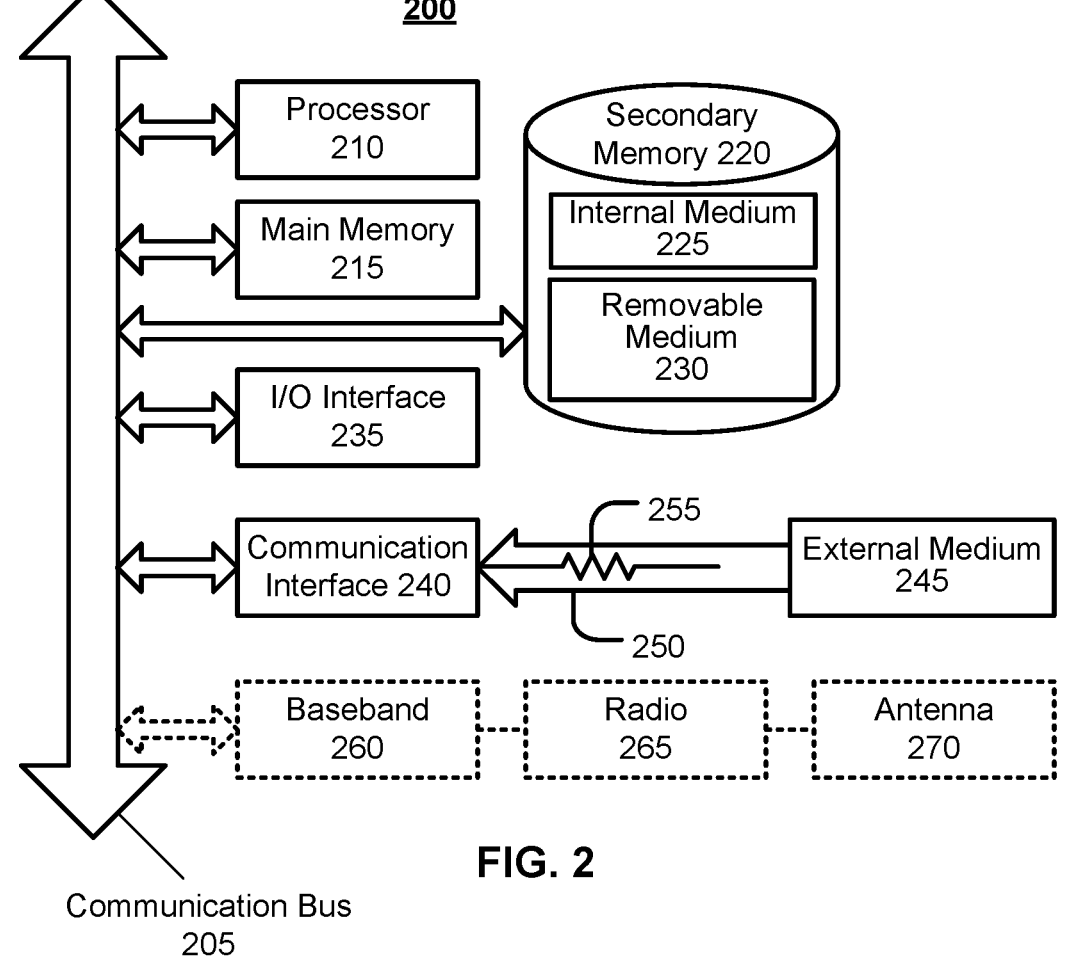
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute software 112) described herein, and may represent components of management system 110, user system(s) 130, power system(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein (e.g., software 112). It should be understood that programs stored in the memory and executed by processor 210 may be written and/or compiled according to any suitable language, including without limitation C/C++, Java, JavaScript, Perl, Visual Basic, NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like. Secondary memory 220 is a non-transitory computer-readable medium having computer-executable code (e.g., software 112) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as software 112) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130 that is a smart phone or other mobile device). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information (e.g., in the case of a user system 130 that is capable of operating as a telephone), then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.3. Example Data Flow

Figure 3:
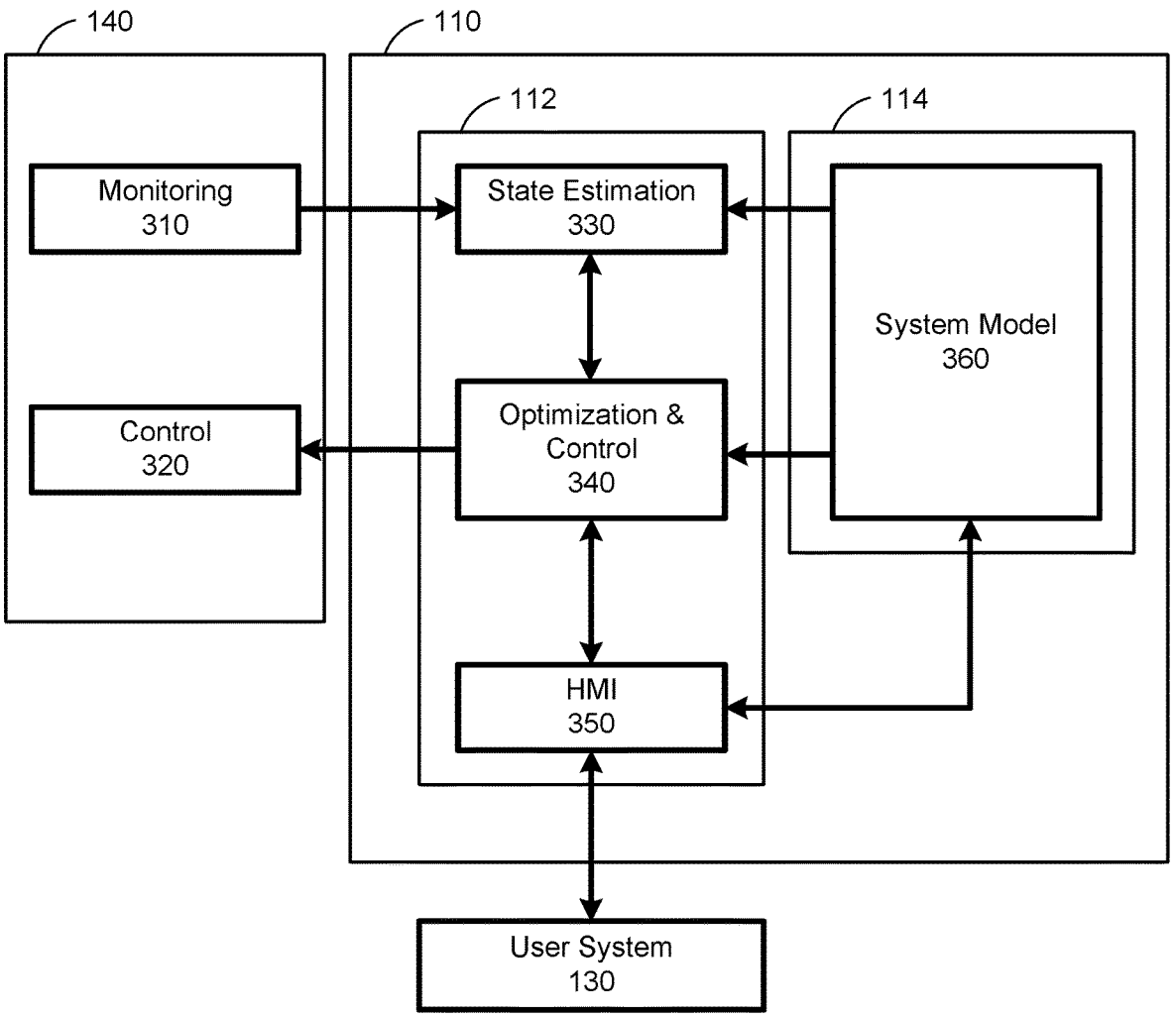
FIG. 3 illustrates an example data flow between systems and software modules within the example infrastructure, according to an embodiment.

FIG. 3 illustrates an example data flow between management system 110, a user system 130, and a power system 140, according to an embodiment. Power system 140 may comprise a monitoring module 310 and a control module 320. Software 112 of management system 110 may comprise a state estimation module 330, a control and optimization module 340, and a human-to-machine interface (HMI) 350. Database 114 of management system 110 may store a system model 360. It should be understood that communications between the various systems may be performed via network(s) 120. In addition, communications between a pair of modules may be performed via an application programming interface (API) provided by one of the modules.

Monitoring module 310 may monitor and collect data that are output by one or more sensors in the network of power system 140. Monitoring module 310 may also derive data from the collected data. Monitoring module 310 may transmit or "push" the collected and/or derived data as system telemetry to state estimation module 330 (e.g., via an API of state estimation module 330). Alternatively, state estimation module 330 may retrieve or "pull" the system telemetry from monitoring module 310 (e.g., via an API of monitoring module 310). The system telemetry may include measurements at each of one or more nodes and/or other points within the network of power system 140. The system telemetry may be communicated from monitoring module 310 to state estimation module 330 in real time, as data is collected and/or derived, or periodically. As used herein, the term "real time" includes events that occur simultaneously, as well as events that occur contemporaneously, as dictated by ordinary delays resulting from latencies in processing, memory access, communications, and/or the like.

State estimation module 330 receives the system telemetry from monitoring module 310 and uses the system telemetry in conjunction with system model 360 to generate an estimated state of power system 140. In particular, state estimation module 330 may implement one or more of the processes for state estimation, described herein, to prepare an optimization problem based on the system telemetry and system model 360, and solve the optimization problem. State estimation module 330 may generate the estimated state of power system 140 in real time or periodically (e.g., whenever new system telemetry is received). The estimated state may comprise an estimated voltage magnitude and phase angle for each node within the network of power system 140. State estimation module 330 may send or "push" the estimated state of power system 140 to optimization and control module 340 (e.g., via an API of optimization and control module 340). Alternatively, optimization and control module 340 may retrieve or "pull" the estimated state of power system 140 from state estimation module 330 (e.g., via an API of state estimation module 330). The estimated state may be communicated from state estimation module 330 to optimization and control module 340 in real time, as the estimated state is generated, or periodically.

Optimization and control module 340 receives the estimated state from state estimation module 330, and uses the estimated state in conjunction with system model 360 to determine an optimal configuration for one or more components of power system 140, and then control power system 140 to transition to the optimal configuration. In particular, optimization and control module 340 may generate control signals that are transmitted to control module 320 of power system 140. For example, the control signals may be sent via an API of control module 320. The control signals may be communicated from optimization and control module 340 of management system 110 to control module 320 of power system 140 in real time, as the estimated states are received and analyzed, periodically, or in response to a user operation. Optimization and control module 340 may control power system 140 automatically (e.g., without any user intervention), semi-automatically (e.g., requiring user approval or confirmation), and/or in response to manual user inputs.

Control module 320 of power system 140 receives the control signals from optimization and control module 340, and controls one or more components of power system 140 in accordance with the control signals. Examples of such control include, setting a setpoint (e.g., for real and/or reactive power for distributed energy resources), adjusting the power output of a power generator, adjusting the charging or discharging of a BES system, adjusting the power input to a load, closing or opening a switch (e.g., circuit breaker), and/or the like.

Human-to-machine interface 350 may generate a graphical user interface that is transmitted to user system 130 and receive inputs to the graphical user interface via user system 130. The graphical user interface may provide information regarding the estimated state of power system 140 determined by state estimation module 330, an optimal configuration of power system 140 determined by optimization and control module 340, a control decision or recommendation determined by optimization and control module 340, a visual representation of system model 360, and/or the like. In addition, the graphical user interface may provide inputs that enable a user of user system 130 to configure settings of state estimation module 330, configure settings of optimization and control module 340, configure system model 360, specify or approve controls to be transmitted to control module 320 of power system 140, analyze power system 140, and/or the like.

System model 360 may be stored in database 114 and accessed by modules, such as state estimation module 330 and optimization and control module 340, via any known means (e.g., via an API of database 114, a direct query of database 114, etc.). Database 114 may store a system model 360 for each power system 140 that is managed by management system 110. Each system model 360 models the network of power system 140 in any suitable manner. For example, system model 360 may comprise a single-line diagram representing the components of the network and their relationships to each other. It should be understood that the single-line diagram may be implemented as a data structure that is capable of being automatically analyzed by software modules, including state estimation module 330 and optimization and control module 340.

The estimated state, output by state estimation module 330, may be used as an input to any downstream function that may benefit from an estimated state of power system 140. These downstream functions may be implemented by optimization and control module 340, human-to-machine interface 130, and/or other modules within management system 110 or an external system. In the event that a downstream function is implemented by another module, state estimation module 330 may send or "push" the estimated state of power system 140 to the other module (e.g., via an API of the implementing module or relayed through optimization and control module 340). Alternatively, the other module may retrieve or "pull" the estimated state of power system 140 from state estimation module 330 (e.g., via an API of state estimation module 330) or from optimization and control module 340 (e.g., via an API of optimization and control module 340). The estimated state may be communicated to the implementing module in real time, as the estimated state is generated, or periodically.

As an example of a downstream function, the estimated state may be stored and, in response to a triggering event, displayed to a user within a graphical user interface of human-to-machine interface 350. The triggering event may be a user requesting the estimated state, the estimated state satisfying an alert condition, and/or the like. In the event that the estimated state satisfies an alert condition, the user may be prompted via the graphical user interface or other means (e.g., a notification sent via email message, text message, voice message, etc.) to perform a preventative or corrective control operation (e.g., via an input of the graphical user interface, manually, etc.).

In general, the estimated state, which may comprise voltage magnitudes and phase angles for each of the nodes in the network in power system 140, may be to produce a baseline model for one or more downstream functions. A downstream function may utilize this baseline model to perform any type of analysis on power system 140, including optimal power flow, distributed energy resource (DER) management, contingency analysis, and/or the like. The analysis may be performed in response to a user operation, or automatically in real time or periodically. In some cases, the analysis may be provided to a user via human-to-machine interface 350. In other cases, optimization and control module 340 may, automatically (i.e., without user intervention) or semi-automatically (e.g., with user approval or confirmation), initiate a control operation based on the analysis. Initiation of the control operation may comprise transmitting control commands to control module 320 of power system 140, which may responsively control power system 140 according to the control commands.

As an example, the estimated state may be used by optimization and control module 340 as an input to contingency analysis. Contingency analysis may utilize the estimated state of power system 140 in a baseline model (e.g., system model 360) of power system 140 to perform "what-if" analysis for various hypothetical scenarios (e.g., the failure of a component of power system 140). For example, the estimated state (e.g., voltage magnitude and phase angle) at each node may be used to calculate the power generation or consumption at that node for use in the contingency analysis. The contingency analysis may be executed in real time (e.g., as estimated states are output by state estimation module 330), periodically, and/or in response to a triggering event (e.g., user request, satisfaction of one or more monitored criteria, etc.). If a problem is detected by the contingency analysis, a user may perform a preventative or corrective control operation (e.g., via an input of a graphical user interface of human-to-machine interface 350, manually, etc.). Alternatively or additionally, optimization and control module 340 may, automatically or semi-automatically, perform contingency analysis for one or more hypothetical scenarios, and when a problem is detected, initiate a preventative or corrective control operation via communication with control module 320 of power system 140.

As an additional example, the estimated state may be used by optimization and control module 340 as an input to Volt-Var optimization. Volt-Var optimization may utilize the estimated state (e.g., voltage magnitudes and phase angles) and system model 360 (or other model) as a baseline to determine optimal voltage levels and reactive power to achieve efficient operation of power system 140 (e.g., by reducing system losses, peak demand, and/or energy consumption). The Volt-Var optimization may be executed in real time (e.g., as estimated states are output by state estimation module 330), periodically, and/or in response to a triggering event (e.g., user request, satisfaction of one or more monitored criteria, etc.). Optimization and control module 340 may, automatically or semi-automatically, initiate a control operation via communication with control module 320 of power system 140 to conform power system 140 to the optimal voltage levels and reactive power, as determined by the Volt-Var optimization. The control operation may comprise controlling switchable capacitors, on-load tap-changers, and/or the like.

As an additional example, the estimated state may be used by optimization and control module 340 as an input to optimal power flow. Optimal power flow may utilize the estimated state and system model 360 (or other model) as a baseline to manage power generation within power system 140. For example, the optimal power flow may determine the optimal setpoints for power generators within power system 140, to meet the demand on power system 140, while minimizing operating costs and/or satisfying one or more other criteria. Optimal power flow may be executed in real time (e.g., as estimated states are output by state estimation module 330), periodically, and/or in response to a triggering event (e.g., user request, satisfaction of one or more monitored criteria, etc.). Optimization and control module 340 may, automatically or semi-automatically, initiate a control operation via communication with control module 320 of power system 140 to conform power system 140 to the setpoints determined by the optimal power flow.

As an additional example, the estimated state may be used by optimization and control module 340 as an input to distributed energy resource (DER) management, which can be thought of as a species of optimal power flow. DER management may utilize the estimated state and system model 360 (or other model) to manage distributed energy resources within power system 140. For example, the DER management may manage the setpoints for active and reactive power, power factor, and/or voltage at the points of interconnection with distributed energy resources or other nodes within the network. The DER management may be executed in real time (e.g., as estimated states are output by state estimation module 330), periodically, and/or in response to a triggering event (e.g., user request, satisfaction of one or more monitored criteria, etc.). Optimization and control module 340 may, automatically or semi-automatically, initiate a control operation via communication with control module 320 of power system 140 to conform power system 140 to the setpoints determined by the DER management.

2. Process Overview

Embodiments of processes for state estimation for a power system, using parameterized potential functions for inequality constraints, will now be described in detail. It should be understood that the described processes may be embodied in one or more software modules that are executed by one or more hardware processors, for example, as software 112 executed by processor(s) 210 of management system 110. The described processes may be implemented as instructions represented in source code, object code, and/or machine code. These instructions may be executed directly by hardware processor(s) 210, or alternatively, may be executed by a virtual machine or container operating between the object code and hardware processors 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of sub-processes, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Throughout the present disclosure, an inequality constraint will be expressed in the form:

$$g(x) \le 0$$

wherein $g(\bullet)$ is an inequality function that relates an input x to an output $g(x)$. The input x represents a state of the system being monitored and controlled, such as power system 140. In the case of a power system 140, the state may be defined as the voltage magnitude and phase angle at each node in the network. It should be understood that any inequality constraint can be expressed in this manner, as well as other manners. Thus, for ease of understanding and conceptualization, it will be assumed that all inequality constraints are expressed in the above form. However, it should be understood that, in an actual implementation, the inequality constraint can be expressed in a different manner and either converted to the above form or used in its native form with appropriate modifications to other components of the SE problem.

The constrained optimization problem may be expressed as:

$$\min_x f(x)$$

subject to $$g(x) \le 0 \text{ for } j = 1, \dots, n,$$

wherein n represents the total number of inequality constraints to which the objective function $f(x)$ is subject. It should be understood that an "optimization problem" may comprise any problem of finding the best solution from all feasible solutions, and an "objective function" may be any function that is to be maximized or minimized. In addition, the term "constrained" refers to a problem in which the objective function is subject to a respective constraint, whereas the term "unconstrained" refers to a problem in which all respective constraints have been converted into an objective function. The term "convex" refers to any function in which the line segment between any two points on the graph of the function does not lie below the graph between the two points.

It should be understood that an inequality constraint $g(x) \le 0$ represents a range of possible values of a measurement function corresponding to an input x. For example, in the context of a power system 140, this range could be the capacity of a power generator (e.g., from zero to a maximum power output), the capacity of a BES system (e.g., based on the current charge level of the BES system), and/or the like.

One method for enforcing inequality constraints in state estimation is to treat violated limits as pseudo-measurements in a WLS problem:

$$\min_x \left(\frac{1}{2}\right)\left(f(x) + \sum_{j}^{n} w_j(g_j(x))^2\right)$$

wherein each w is a weight, j is an index into the set of inequality constraints, and n represents the total number of inequality constraints. Each instance of $w_j(g_j(x))^2$ corresponds to a pseudo-measurement with a value of zero, corresponding to an inequality constraint j. To drive a violation of an inequality constraint to zero, the weight $w_j$ for each violated inequality constraint j generally needs to be set to a very large value.

In an embodiment, instead of the pseudo-measurement method described above, a parameterized potential function is used for each violated inequality constraint. In the context of the parameterized potential function, the term "parameterized" refers to the inclusion of an adjustable parameter within the potential function, and the term "potential" refers to the analogy between the unconstrained objective function and a generalized potential field (e.g., like a particle within a potential field is pulled towards a zero-force point). While not necessary to the embodiment, the parameterized potential function may be a quadratic function. For example, each parameterized potential function may be expressed as:

$$w(g(x) - u)^2$$

wherein u is a center-of-attraction parameter that defines a "center of attraction" that, conceptually, acts like a spring to pull the output of the inequality function $g(x)$ towards a feasible range. A "feasible range" is a set of values of $g(x)$ that do not violate the respective constraint. A value of $g(x)$ violates its respective constraint when $g(x) > \varepsilon$, wherein $\varepsilon$ is a tolerance that is greater than or equal to zero. Conversely, a value of $g(x)$ does not violate its respective constraint when $g(x) \le \varepsilon$. The tolerance $\varepsilon$ is a practical consideration, since, in reality, it may be impossible to perfectly satisfy every inequality constraint. The value of $\varepsilon$ may be set using any standard means.

Using the above parameterized potential function, the SE problem becomes an unconstrained convex optimization problem UCP(u):

$$UCP(u): \min_x P(x, u)$$

wherein $$P(x, u) = f(x) + \sum_{j}^{n} w_j(g_j(x) - u_j)^2$$

wherein $f(x)$ is the objective function of the constrained optimization problem to be minimized. In an embodiment, $f(x)$ is the WLS problem:

$$\sum_i^m w_i(z_i - h_i(x))^2$$

wherein $z_i$ represents the system telemetry at a point i, wherein $h(\bullet)$ is a measurement function that relates an input x to an output h(x), representing a predicted measurement given the input x, $w_i$ is a respective weight, and m represents the total number of points being measured in system model 360. However, more generally, $f(x)$ encompasses any convex objective function to be minimized.

Figure 4A:
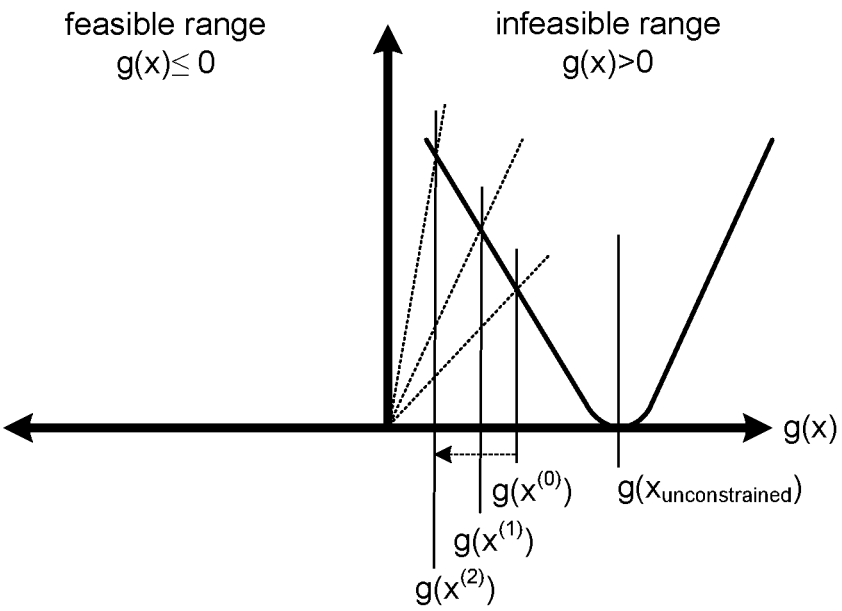
FIGS. 4A and 4B illustrate the difference between the operation of a pseudo-measurement weight adjustment and the operation of a virtual measurement that utilizes a center-of-attraction parameter, according to an embodiment.
Figure 4B:
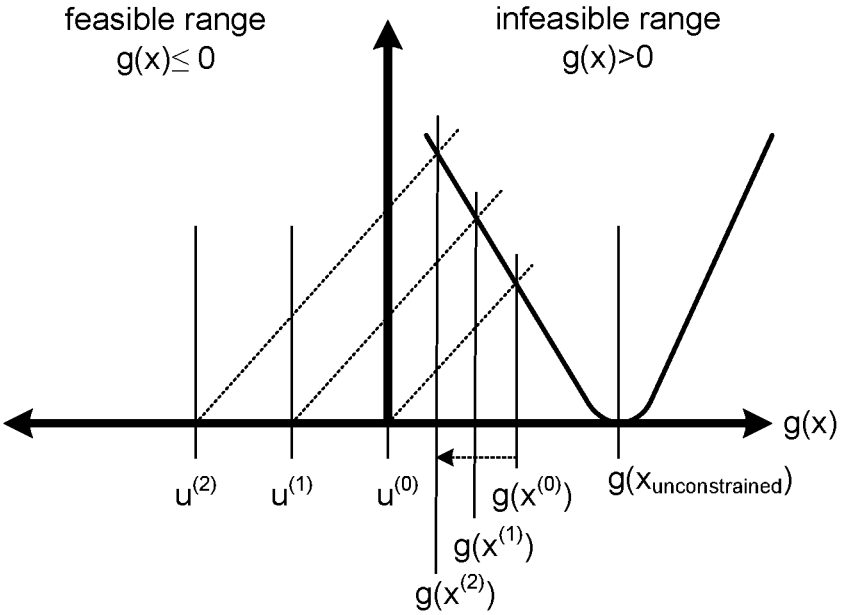

Each parameterized potential function can be thought of as a virtual measurement, as opposed to a pseudo-measurement. FIGS. 4A and 4B illustrate the difference between the operation of a pseudo-measurement method, compared to the operation of a virtual measurement method that utilizes a center-of-attraction parameter u. The dotted lines in each figure represent gradients of the quadratic inequality function g(x).

As illustrated in FIG. 4A, each pseudo-measurement acts as a penalty, with the weight being increased as necessary to cause the WLS problem to drive g(x) towards zero (e.g., from $g(x^{(0)})$ to $g(x^{(1)})$ to $g(x^{(2)})$, and so on), in order to minimize the violation. This can result in very large values for the corresponding weight w in the pseudo-measurement.

In contrast, as illustrated in FIG. 4B, each virtual measurement utilizes a center-of-attraction parameter u. The value of this center-of-attraction parameter u defines a location (i.e., a center of attraction) towards which g(x) is attracted, with the weight w representing the strength of attraction. In other words, the value of the center-of-attraction parameter u can be analogized as an anchor point to which one end of a spring is attached, with the other end of the spring attached to g(x), and weight w analogous to the Hook's constant of the spring. Notably, in contrast to the use of pseudo-measurements, the use of virtual measurements does not require the weight w to be increased to a very large value.

While solving UCP(u) iteratively, instead of solving the original constrained optimization problem, the value of each center-of-attraction parameter u may be updated to "pull" the value of g(x) towards and eventually into the feasible range. For example, the value of center-of-attraction parameter u may start at zero (i.e., $u^{(0)}$), and the problem UCP($u^{(0)}$) may be solved to convergence, resulting in $g(x^{(0)})$. Then, the value of center-of-attraction parameter u may be updated to $u^{(1)}$, and the problem UCP($u^{(1)}$) may be solved to convergence, resulting in $g(x^{(1)})$. Then, the value of center-of-attraction parameter u may be updated to $u^{(2)}$, and the problem UCP($u^{(2)}$) may be solved to convergence, resulting in $g(x^{(2)})$. This iterative process may continue until the value of g(x) is within the feasible range (e.g., given a tolerance $\varepsilon$).

The force field associated with the potential field of P(x, u) is defined by the negative gradient of P(x, u):

$$\text{Force}(x, u) = -\nabla_x P(x, u)$$

The stationary point of this force field is parametric on the center-of-attraction parameters u of the parameterized potential functions:

$$x(u) = \underset{x}{\arg\min} P(x, u)$$

If x(u) satisfies the inequality constraints, x(u) satisfies the Karush-Kuhn-Tucker (KKT) condition of the constrained optimization problem. In particular, the KKT condition for the constrained optimization problem is:

$$\nabla f(x) + \sum_{j \in B} \lambda_j \nabla g_j(x) = 0$$

wherein $\lambda_j$ is the Lagrange multiplier, and B represents the set of binding constraints:

$$B = \{j \mid g_j(x) \leq 0\}$$

The joint system below has the same solution as the KKT condition of the constrained optimization problem:

$$\nabla f(x) + \sum_{j \in B} 2w_j(g_j(x) - u_j)\nabla g_j(x) = 0$$

$$g_j(x) = 0, \, j \in B$$

The parameters of the parameterized potential functions are related to the Lagrange multiplier $\lambda_j$ as follows:

$$\lambda_j = -2w_j u_j$$

For any KKT point in the constrained optimization problem, there is a related unconstrained convex optimization problem P(x, u) in which the center-of-attraction parameter u of each parameterized potential function is uniquely defined for any non-zero weight w. Thus, the constrained optimization problem is converted into a problem of placing the center-of-attraction parameters u, such that the KKT condition of the original constrained optimization problem is satisfied.

Figure 5:
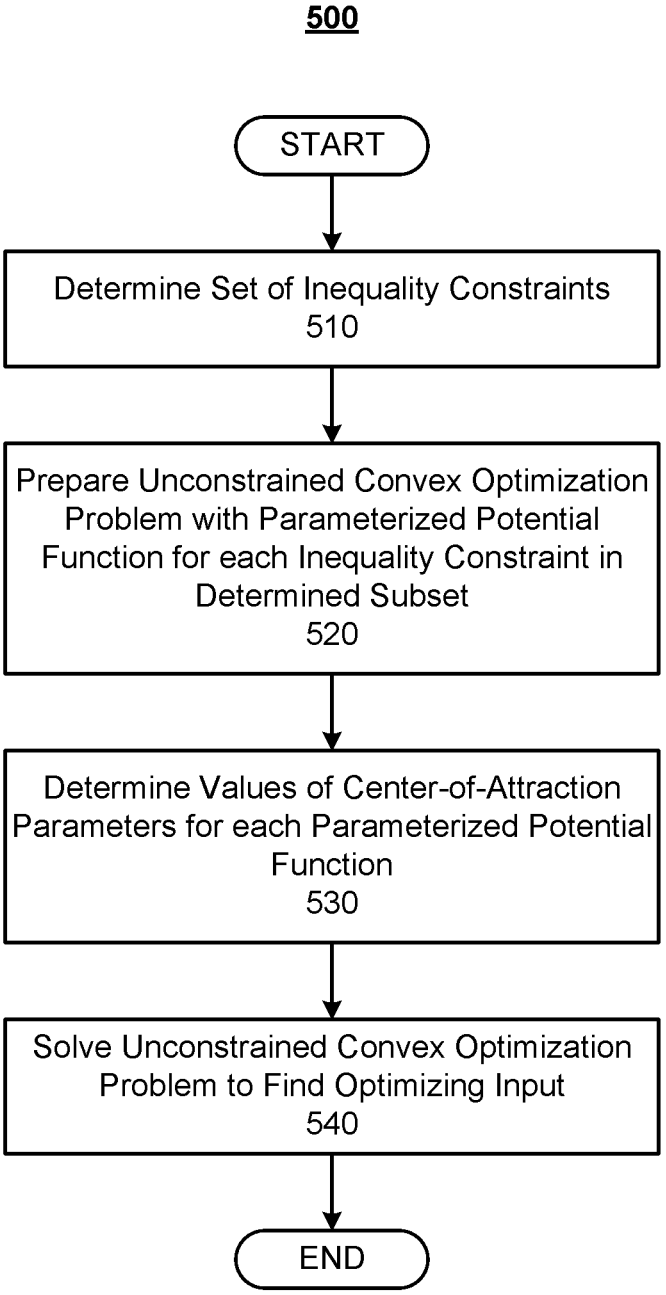
FIG. 5 illustrates a solution process, according to an embodiment.

FIG. 5 illustrates a solution process 500, according to an embodiment. Solution process 500 may be implemented by state estimation module 330 in software 112 of management system 110.

In subprocess 510, a set of the inequality constraint(s), to which the objective function $f(x)$ is subject, is determined. In an embodiment described elsewhere herein, in which solution process 500 is iteratively performed, this set of inequality constraint(s) may consist of all inequality constraints which were violated in an immediately preceding iteration. In an alternative embodiment, one or more other criteria may be used for determining the set of inequality constraints, or the set of inequality constraints may be determined to include all of the inequality constraints.

In subprocess 520, an unconstrained convex optimization problem is prepared based on the set of inequality constraint(s) determined in subprocess 510. In particular, a parameterized potential function may be generated for each inequality constraint in the determined set of inequality constraint(s) and summed with the objective function from the constrained optimization problem in a second objective function to be minimized. Again, the unconstrained convex optimization problem may be expressed as:

$$\min_{x}\left( f(x) + \sum_{j=1}^{n} w_j(g_j(x) - u_j)^2 \right)$$

wherein $w_j(g_j(x) - u_j)^2$ represents a parameterized quadratic potential function for an inequality constraint j in the set of inequality constraints having size n, determined in subprocess 510.

In subprocess 530, the values of the center-of-attraction parameters $u_j$ in all parameterized potential functions are determined. In an embodiment in which process 500 is performed iteratively, the value of the center-of-attraction parameter $$u_j^{(k)}$$

for a current iteration k may be calculated based on a value of that center-of-attraction parameter $$u_j^{(k-1)}$$

that was determined in an immediately preceding iteration k−1. The value of a center-of-attraction parameter $u_j$ in a parameterized potential function may also be calculated based on a value of the inequality function $g_j(x)$ in that same parameterized potential function. In other words, the value of the center-of-attraction parameter u may be adjusted based on the amount of violation.

In an embodiment, the value of each center-of-attraction parameter $u_j$ may be determined as follows:
when the set inequality constraints that are determined to be violated by the most recently found optimizing input is not empty, $$u_j^{(k)} = u_j^{(k-1)}, \; j \in V^{(k)} \text{ and } j \notin A^{(k)},$$

$$u_j^{(k)} = u^{initial}, \; j \in A^{(k)}; \text{ and}$$

when the set inequality constraints that are determined to be violated by the most recently found optimizing input is empty, $$\text{if } g_j(x^{(k-1)}) \ge 0, \; u_j^{(k)} = u_j^{(k-1)} - \alpha * g_j(x^{(k-1)})$$

$$\text{if } g_j(x^{(k-1)}) < 0, \; u_j^{(k)} = u_j^{(k-1)} + \alpha * \left( g_j(x^{(k-1)}) - u_j^{(k-1)} \right)$$

wherein $$0 < \alpha \le 1$$

wherein $u^{initial}$ is a predefined value, and $\alpha$ is a scaling factor, which may be determined empirically or in any appropriate manner, or may be omitted or set to $\alpha=1$ so as to be effectively omitted. In an embodiment, $u^{initial}=0$.

In subprocess 540, the unconstrained convex optimization problem P(x, u) is solved by finding an input x that minimizes P(x, u), given the center-of-attraction parameters u determined in subprocess 530. In an embodiment in which process 500 is performed iteratively, the initial input $x^{(k),ini}$ in iteration k may be set to the final input $x^{(k-1),fin}$ that was output as the optimizing input from the immediately preceding iteration k−1. The result of subprocess 540 and process 500 will be a final and optimizing input $x^{(k),fin}$ for the current iteration k of process 500. This final input $x^{(k),fin}$ represents an estimated state of power system 140.

Figure 6:
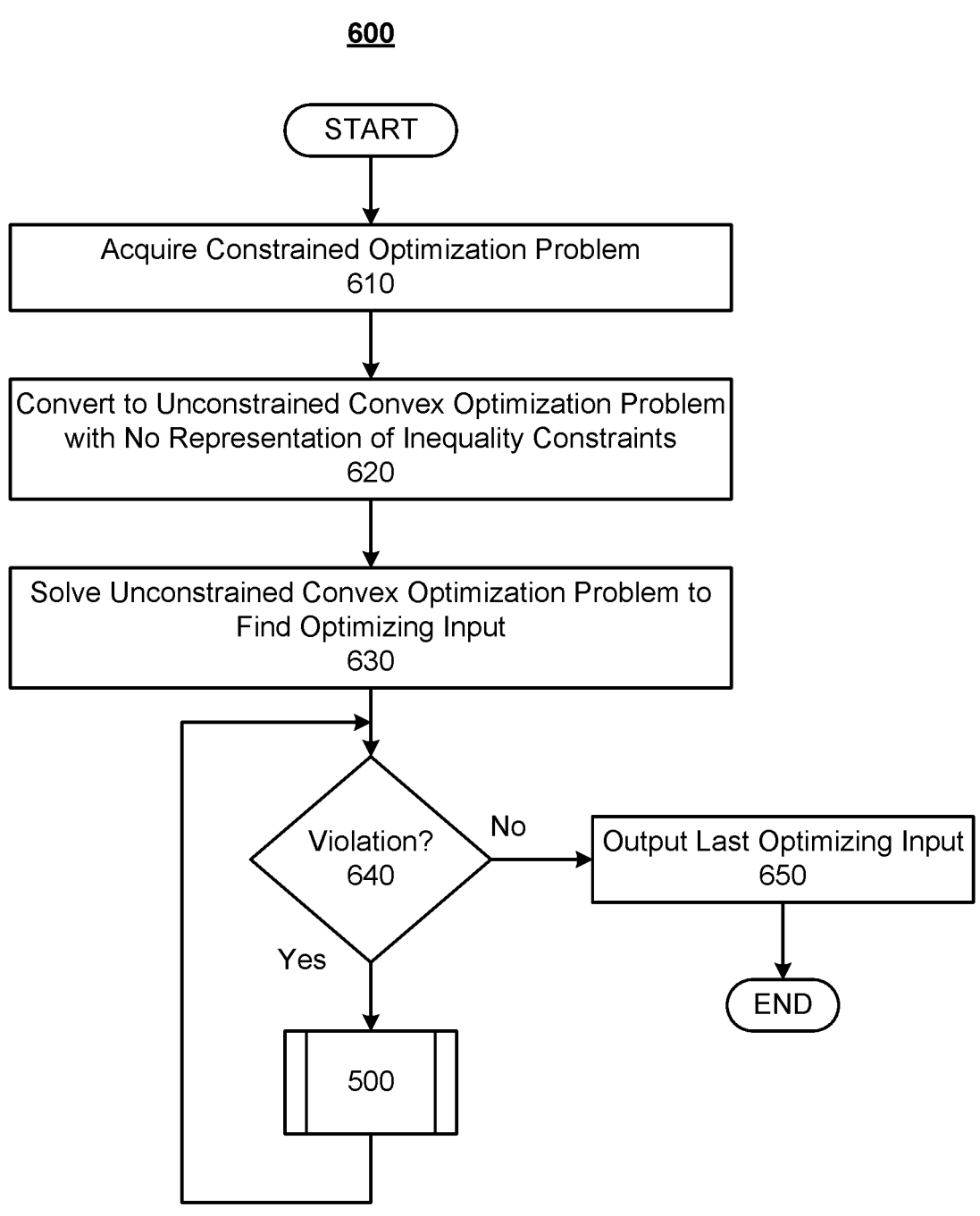
FIG. 6 illustrates an overall algorithm for solving a constrained optimization problem, according to an embodiment.

FIG. 6 illustrates an overall algorithm 600 for solving a constrained optimization problem, according to an embodiment. Algorithm 600 may be implemented by state estimation module 330 in software 112 of management system 110. Algorithm 600 operates to convert a constrained optimization problem, comprising an objective function to be minimized subject to one or more inequality constraints, to an unconstrained convex optimization problem, and then solve the unconstrained convex optimization problem. In solving the unconstrained convex optimization problem, algorithm 600 may iteratively execute solution process 500.

Initially, in subprocess 610, the constrained optimization problem is acquired. This acquisition process may comprise retrieving a representation of the constrained optimization problem or retrieving representations of one or more components of the constrained optimization problem, such as the objective function to be minimized, and at least a subset of the inequality functions of the inequality constraint(s) to which the objective function is subject. Again, the constrained optimization problem may be represented as:

$$\min_{x} f(x)$$

$$\text{subject to}$$

$$g_j(x) \le 0, \; j = 1, \dots, n$$

Components of the constrained optimization problem, such as the objective function and any inequality constraints or inequality functions, may be stored in memory that persists over iterations of solution process 500, such that they can be easily accessed in each iteration of solution process 500, without having to be regenerated or redetermined in each iteration.

In subprocess 620, the constrained optimization problem is converted to an unconstrained convex optimization problem without representation of any inequality constraints. In other words, no parameterized potential functions are included in the unconstrained convex optimization problem for any inequality constraints to which the constrained optimization problem is subject. Thus, the unconstrained convex optimization problem may be represented as:

$$P^{(noIC)}: \min_{x} f(x)$$

subject to no inequality constraints.

In subprocess 630, the unconstrained convex optimization problem $P^{(noIC)}$ is solved by finding an input $x^{(noIC),fin}$ that minimizes $P^{(noIC)}$. This input $x^{(noIC),fin}$ represents a potential solution to the optimization problem which may or may not satisfy the inequality constraint(s).

In subprocess 640, it is determined whether or not the most recently found input x violates any of the inequality constraint(s). In the first iteration of subprocess 630, the most recently found input to be evaluated in subprocess 640 will be $x^{(noIC),fin}$. In all subsequent iterations of subprocess 640, the most recently found input to be evaluated in subprocess 640 will be the final input $x^{(k-1),fin}$ found by the most recent iteration k−1 of solution process 500. In an embodiment, an inequality constraint is violated when the value of its inequality function is not within a tolerance ε of the feasible range (i.e., $g(x)>\varepsilon$). Conversely, in such an embodiment, an inequality constraint is not violated when the value of its inequality function is within a tolerance ε of the feasible range (i.e., $g(x)\le\varepsilon$). If no inequality constraints are violated (i.e., "No" in subprocess 640), algorithm 600 proceeds to subprocess 650. Otherwise, if at least one inequality constraint is violated (i.e., "Yes" in subprocess 640), algorithm 600 executes an iteration of solution process 500.

In an embodiment, in each iteration of solution process 500, the set of inequality constraints determined in subprocess 510 consists of only those inequality constraints that have been violated in any prior iteration. In other words, inequality constraints that have never been violated are not included in the set of inequality constraints determined in subprocess 510. Thus, the unconstrained convex optimization problem that is generated in subprocess 520 and solved in subprocess 540 will only consist of parameterized potential functions for previously violated inequality constraints. The unconstrained convex optimization problem that is generated and solved in an iteration k may be referred to herein as $P^{(k)}$:

$$P^{(k)}: \min_x\left(f(x)+\sum_j^n w_j\big(g_j(x)-u_j^{(k)}\big)^2\right)$$

wherein j is an index of the set of violated inequality constraints, and n is the size of the set of violated inequality constraints.

In addition, each center-of-attraction parameter $u^{(k)}$ in an iteration k of solution process 500 may be set, as discussed with respect to subprocess 530, based on the value of the corresponding center-of-attraction parameter $u^{(k-1)}$ in the immediately preceding iteration k−1 of solution process 500, or initialized to $u^{initial}$ (e.g., zero) if there was no preceding iteration k−1 or if there was no value for the corresponding center-of-attraction parameter $u^{(k-1)}$ in the immediately preceding iteration k−1 of solution process 500 (e.g., because the corresponding inequality constraint was not previously violated). The output of each iteration of solution process 500 will be a final input $x^{(k),fin}$, representing the optimizing input, given the parameters of the unconstrained convex optimization problem in the current iteration k.

In subprocess 650, once no inequality constraints are violated (i.e., "No" in subprocess 640), the most recently found (i.e., last) optimizing input is output as the final estimated state of power system 140. This may be the input $x^{(noIC),fin}$, found in subprocess 630, if no violations were determined in the first, and therefore, only iteration of subprocess 640. Otherwise, this final estimated state will be an input $x^{(IC),fin}$, output by the last iteration of solution process 500. It should be understood that this final estimated state of power system 140, output by subprocess 650, may be sent to optimization and control module 340, which may use the final estimated state to optimize a configuration of power system 140 and/or otherwise control power system 140 as discussed elsewhere herein.

An example of pseudocode, implementing an embodiment of algorithm 600, is provided below:

```
01.   Initialize problem to P^(noIC).
02.   Initialize P^(noIC) with x^(noIC),ini.
03.   Solve P^(noIC) to convergence to find x^(noIC),fin.
04.   If g_j(x^(noic),fin) ≤ ε, ∀j then output x^(noIC),fin and stop.
05.   k = 0.
06.   V_IC^(k) = {j | g_j(x^(noIC),fin) > 0}.
07.   Solve P^(k) to convergence to find x^(k),fin.
08.   A^(k) = {j | j ∉ V_IC^(k) and g_j(x^(k),fin) > 0}.
09.   If A^(k) = { } then go to 11.
10.   If A^(k) ≠ { } then V_IC^(k+1) = V_IC^(k) + A^(k); update P^(k+1); k = k + 1;
      and go to 07.
11.   If g_j(x^(k),fin) ≤ ε, ∀j then output x^(k),fin and stop.
12.   A^(k) = {j | j ∉ V_IC and g_j(x^(k),fin) > 0}.
13.   If A^(k) ≠ { } then
         V_IC^(k+1) = V_IC^(k) + A^(k);
         u_j^(k+1) = u_j^(k) for j ∈ V_IC^(k); and
         u_j^(k+1) = u^initial for j ∈ A^(k).
14.   If A^(k) = { } then
         u_j^(k+1) = u_j^(k) − α*g_j(x^(k)) for j for which g_j(x^(k)) ≥ 0; and
         u_j^(k+1) = u_j^(k) + α*(g_j(x^(k)) − u_j^(k)) for j for which g_j(x^(k)) < 0.
15.   x^(k+1),ini = x^(k),fin.
16.   k = k + 1.
17.   Solve P^(k) to convergence to find x^(k),fin.
18.   Go to 11.
```

Notably, in the above pseudocode, the set $$V_{IC}^{(k)}$$

consists of all inequality constraints that have been determined to be violated in all prior iterations up to and including the current iteration k, and the set $A^{(k)}$ consists of any inequality constraints that are determined to be violated by the most recently found optimizing input. In an embodiment, the initialization value $u^{initial}$ for each center-of-attraction parameter $u_j$ is a predefined value, such as zero. However, it should be understood that other initialization values (i.e., non-zero initialization values) could be used for the center-of-attraction parameters $u_j$.

It should also be understood that how an iteration k is defined or delineated is arbitrary. For example, in the above pseudocode, the sets $V_{IC}$ and A and the center-of-attraction parameters $u_j$ are determined, after solving the unconstrained convex optimization problem $P^{(k)}$, for a future iteration k+1. However, an iteration k can alternatively be delineated as including the determination of the sets $V_{IC}$ and A and the center-of-attraction parameters $u_j$ prior to solving the unconstrained convex optimization problem $P^{(k)}$, as illustrated in solution process 500. In any case, the particular delineation of the iterations k, in any of the disclosed examples, should not be construed as limiting in any respect.

3. Example Usage

In an embodiment, state estimation module 330 of a management system 110 is used to estimate the state of a system, such as power system 140, using algorithm 600. In particular, state estimation module 330 may receive system telemetry from a monitoring module 310 of the system, and use the system telemetry and system model 360 (e.g., retrieved from database 114) to define an optimization problem, subject to inequality constraints, as an unconstrained convex optimization problem. The optimization problem is formed as an unconstrained optimization problem by generating a parameterized potential function $w(g(x)-u)^2$ for at least a subset of violated inequality constraints and minimizing the sum of any generated parameterized potential functions and an objective function $f(x)$. The objective function $f(x)$ may be derived from the system telemetry and system model 360 and represents the system. The use of the parameterized potential functions, representing virtual measurements in the case of state estimation problems, shapes the potential field of the resulting unconstrained optimization problem, such that its stationary stationarity condition is identical to the KKT condition of the constrained optimization problem.

The resulting unconstrained optimization problem may be iteratively prepared, using successively updated values for the center-of-attraction parameters u corresponding to violated inequality constraints, and solved, until no inequality constraints are violated (i.e., all inequality constraints are satisfied within a tolerance), to produce a final estimated state. The final estimated state may be output to an optimization and control module 340 of management system 110, which may input the final estimated state into one or more downstream functions, such as the generation of a graphical user interface, contingency analysis, power flow analysis (e.g., dispatcher or optimal power flow analysis), Volt-Var optimization, DER management, and/or the like.

In some cases, one or more of these downstream functions may, automatically (e.g., without user intervention) or semiautomatically (e.g., after user approval or confirmation), issue control commands to a control module 320 of the system, to thereby control the system. Thus, the state estimation may be used to monitor and control a system, such as a power system 140. For example, if the voltage at a measured point is too low, a corresponding power generator in power system 140 may be controlled to increase its reactive power output to increase the voltage at that measured point.

Conventional WLS state estimation methods either ignore inequality constraints or enforce them by using penalty-based heuristics in which weights (e.g., of pseudo-measurements representing inequality constraints) are increased. These penalty-based heuristics eliminate violations by increasing the corresponding weights to the point that they approach infinity, which can cause ill-conditioning of the gain matrix. The disclosed processes enforce inequality constraints in state estimation without having to use large weights. In particular, the disclosed processes will work with any non-zero weights. Thus, they do not require very large weight values, and therefore, avoid ill-conditioning of the gain matrix.

Notably, the disclosed algorithm 600 is robust and easy to implement, and provides fast convergence. In an embodiment, the weights w in the parameterized potential functions and/or the objective function $f(x)$ may be adaptively adjusted based on the rate of convergence. In addition, while discussed in the context of state estimation, the disclosed algorithm 600 could be used in other applications. One such application is training a machine-learning model, such as a neural network, and particularly a physics-informed neural network (PINN) or physics-constrained neural network.

It should be understood that the constrained optimization problem may comprise, in addition to inequality constraint (s), one or more equality constraints. In this case, the equality constraints may be addressed in any manner, including by generating parameterized potential functions for each equality constraint in a similar or identical manner as for the inequality constraint(s), but using the corresponding equality function in place of an inequality function. For example, for an equality constraint $c(x)=0$, the parameterized potential function may be expressed as $w(c(x)-u)^2$.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method of state estimation for a power system, the method comprising using at least one hardware processor to:

acquire a constrained optimization problem comprising a convex first objective function to be minimized subject to one or more inequality constraints;

convert the constrained optimization problem into an unconstrained convex optimization problem comprising a second objective function that is a sum of the first objective function and a parameterized potential function for each of at least a subset of the one or more inequality constraints, wherein each parameterized potential function is defined by an inequality function and a center-of-attraction parameter;

perform a solution process comprising solving the unconstrained convex optimization problem by finding an input to the unconstrained convex optimization problem that minimizes an output of the unconstrained convex optimization problem, wherein one or more center-of-attraction parameters are updated when solving the unconstrained convex optimization problem to ensure that the input satisfies the one or more inequality constraints within a tolerance, and wherein the input represents an estimated state of the power system; and control the power system based on the estimated state, wherein, for an inequality constraint expressed as g(x)≤0, each parameterized potential function is defined as:

$$w(g(x) - u)^2$$

wherein w is a weight, x is the input, g(x) is the inequality function, and u is the center-of-attraction parameter.

2. The method of claim 1, further comprising using the at least one hardware processor to:

solve the first objective function without any inequality constraints by finding an initial optimizing input to the first objective function that minimizes an output of the first objective function, regardless of the one or more inequality constraints;

determine whether or not the one or more inequality constraints are violated by the initial optimizing input;

when having determined that the one or more inequality constraints are not violated, use the initial optimizing input as an output estimated state of the power system; and when having determined that at least one of the one or more inequality constraints is violated, until the one or more inequality constraints are not violated, over one or more iterations, perform the solution process, wherein the solution process further comprises determining a value of each center-of-attraction parameter in each parametric potential function in the unconstrained convex optimization problem, and use the input found by the solution process in a final one of the one or more iterations as the output estimated state of the power system.

3. The method of claim 2, further comprising using the at least one hardware processor to control the power system based on the final estimated state.

4. The method of claim 2, wherein the one or more inequality constraints are determined to be violated when at least one of the one or more inequality constraints is outside of the tolerance, and wherein the one or more inequality constraints are determined not to be violated when all of the one or more inequality constraints are within the tolerance.

5. The method of claim 2, wherein, in the solution process in each of the one or more iterations, a parameterized potential function is included in the unconstrained convex optimization problem for each of the one or more inequality constraints that are violated and none of the one or more inequality constraints that have not been violated.

6. The method of claim 2, wherein determining the value of each center-of-attraction parameter comprises calculating the value of each center-of-attraction parameter based on a prior value of that center-of-attraction parameter.

7. The method of claim 2, wherein determining the value of each center-of-attraction parameter comprises calculating the value of each center-of-attraction parameter in each parameterized potential function based on a value of the inequality function in that parameterized potential function.

8. The method of claim 1, wherein the second objective function is defined as:

$$f(x) + \sum_j w_j(g_j(x) - u_j)^2$$

wherein $f(x)$ is the first objective function, and j is an index of a set of inequality constraints for which a parameterized potential function is included in the unconstrained convex optimization problem.

9. The method of claim 8, wherein determining the value of each center-of-attraction parameter $u_j$ in an iteration k comprises:

when the center-of-attraction parameter $$u_j^{(k)}$$

does not have a prior value, setting the value of the center-of-attraction parameter $$u_j^{(k)}$$

to a predefined value $u^{initial}$; and when the center-of-attraction parameter $$u_j^{(k)}$$

has a prior value $$u_j^{(k-1)},$$

updating the value, of the center-of-attraction parameter $$u_j^{(k)}$$

according to the prior value $$u_j^{(k-1)}$$

and a value of the inequality function $g_j(x^{(k-1)})$.

10. The method of claim 9, wherein the predefined value $u^{initial}$ is zero.

11. The method of claim 8, wherein determining the value of the center-of-attraction parameter $$u_j^{(k)}$$

in an iteration k is performed as follows:

determine a set $V^{(k)}$ that consists of all inequality constraints that have been determined to be violated in all prior iterations up to and including iteration k;

determine a set $A^{(k)}$ that consists of any inequality constraints that are determined to be violated by an optimizing input $x^{(k-1)}$ found in iteration k−1 and were not in the set of inequality constraints in any preceding iteration;

when $A^{(k)}$ is not empty, $$u_j^{(k)} = u_j^{(k-1)}, j \in V^{(k)} \text{ and } j \notin A^{(k)},$$

$$u_j^{(k)} = u^{initial}, j \in A^{(k)}; \text{ and}$$

when $A^{(k)}$ is empty, $$u_j^{(k)} = u_j^{(k-1)} - \alpha * g_j\left(x^{(k-1)}\right), j \text{ for which } g_j\left(x^{(k-1)}\right) \geq 0,$$

$$u_j^{(k)} = u_j^{(k-1)} + \alpha * \left(g_j\left(x^{(k-1)}\right) - u_j^{(k-1)}\right), j \text{ for which } g_j\left(x^{(k-1)}\right) < 0,$$

wherein $u^{initial}$ is a predefined value, $\alpha$ is a scaling factor, $0 < \alpha \leq 1$, and $\varepsilon$ is the tolerance.

12. The method of claim 11, wherein the predefined value $u^{initial}$ is zero.

13. The method of claim 1, further comprising using the estimated state in one or more of a contingency analysis, Volt-Var optimization, or an optimal power flow.

14. The method of claim 1, wherein the first objective function comprises an error calculation in which a value of a measurement function, given the input, is subtracted from a value of a system telemetry.

15. A system comprising:

at least one hardware processor; and software configured to, when executed by the at least one hardware processor, acquire a constrained optimization problem comprising a convex first objective function to be minimized subject to one or more inequality constraints, convert the constrained optimization problem into an unconstrained convex optimization problem comprising a second objective function that is a sum of the first objective function and a parameterized potential function for each of at least a subset of the one or more inequality constraints, wherein each parameterized potential function is defined by an inequality function and a center-of-attraction parameter, solve the unconstrained convex optimization problem by finding an input to the unconstrained convex optimization problem that minimizes an output of the unconstrained convex optimization problem, wherein one or more center-of-attraction parameters are updated when solving the unconstrained convex optimization problem to ensure that the input satisfies the one or more inequality constraints within a tolerance, and wherein the input represents an estimated state of the power system, and control the power system based on the estimated state, wherein, for an inequality constraint expressed as $g(x) \leq 0$, each parameterized potential function is defined as:

$$w(g(x) - u)^2$$

wherein w is a weight, x is the input, $g(x)$ is the inequality function, and u is the center-of-attraction parameter.

16. A non-transitory computer-readable medium having instructions stored thereon, wherein the instructions, when executed by a processor, cause the processor to:

acquire a constrained optimization problem comprising a convex first objective function to be minimized subject to one or more inequality constraints;

convert the constrained optimization problem into an unconstrained convex optimization problem comprising a second objective function that is a sum of the first objective function and a parameterized potential function for each of at least a subset of the one or more inequality constraints, wherein each parameterized potential function is defined by an inequality function and a center-of-attraction parameter;

solve the unconstrained convex optimization problem by finding an input to the unconstrained convex optimization problem that minimizes an output of the unconstrained convex optimization problem, wherein one or more center-of-attraction parameters are updated when solving the unconstrained convex optimization problem to ensure that the input satisfies the one or more inequality constraints within a tolerance, and wherein the input represents an estimated state of the power system; and control the power system based on the estimated state, wherein, for an inequality constraint expressed as $g(x) \leq 0$, each parameterized potential function is defined as:

$$w(g(x) - u)^2$$

wherein w is a weight, x is the input, $g(x)$ is the inequality function, and u is the center-of-attraction parameter.

* * * * *